L. N. LACOMBE.
FRICTION GEARING.
APPLICATION FILED JAN. 27, 1910.
979,315.
Patented Dec. 20, 1910.
2 SHEETS—SHEET 1.
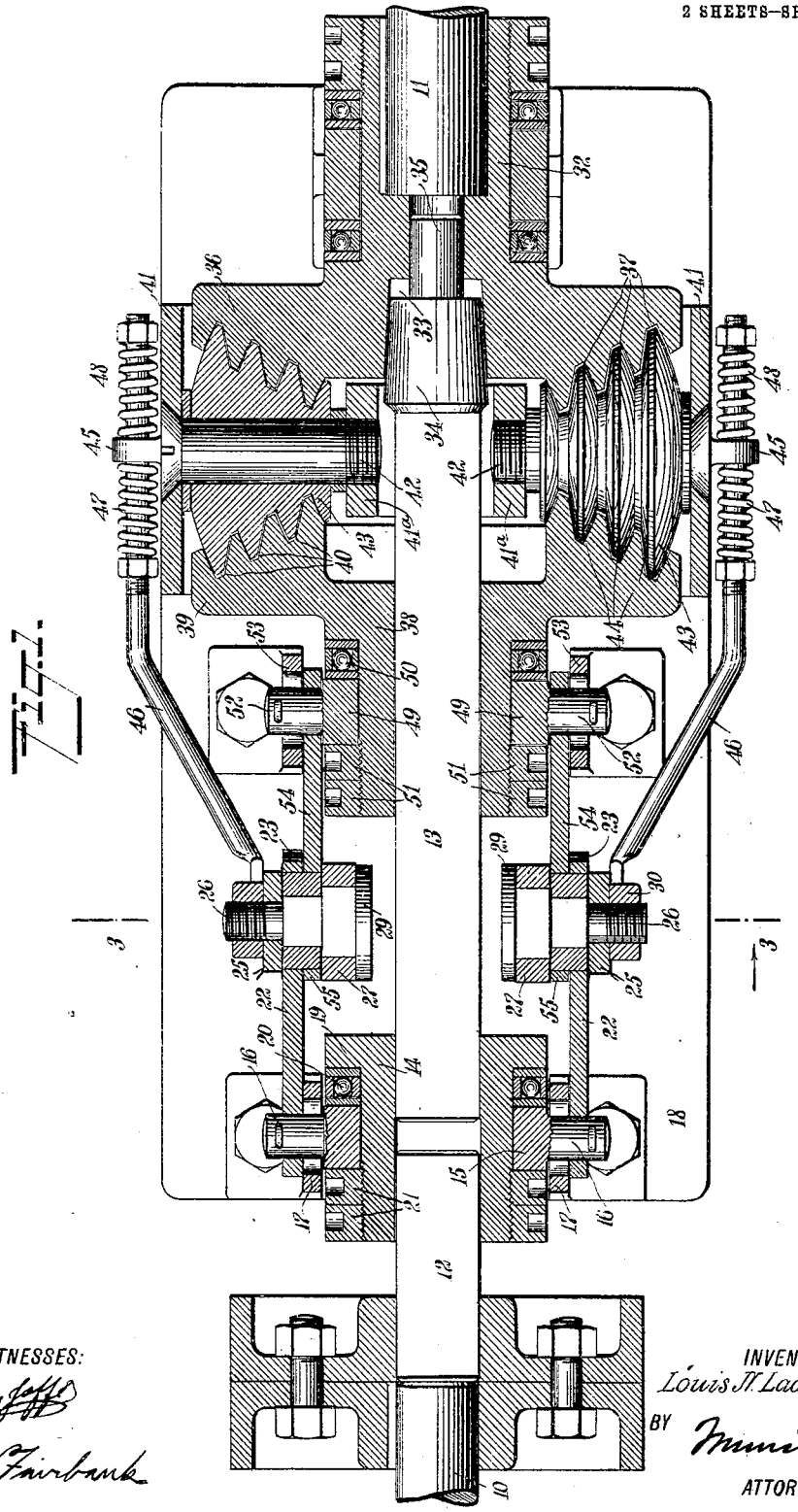
WITNESSES:
INVENTOR
Louis N. Lacombe
BY
ATTORNEYS

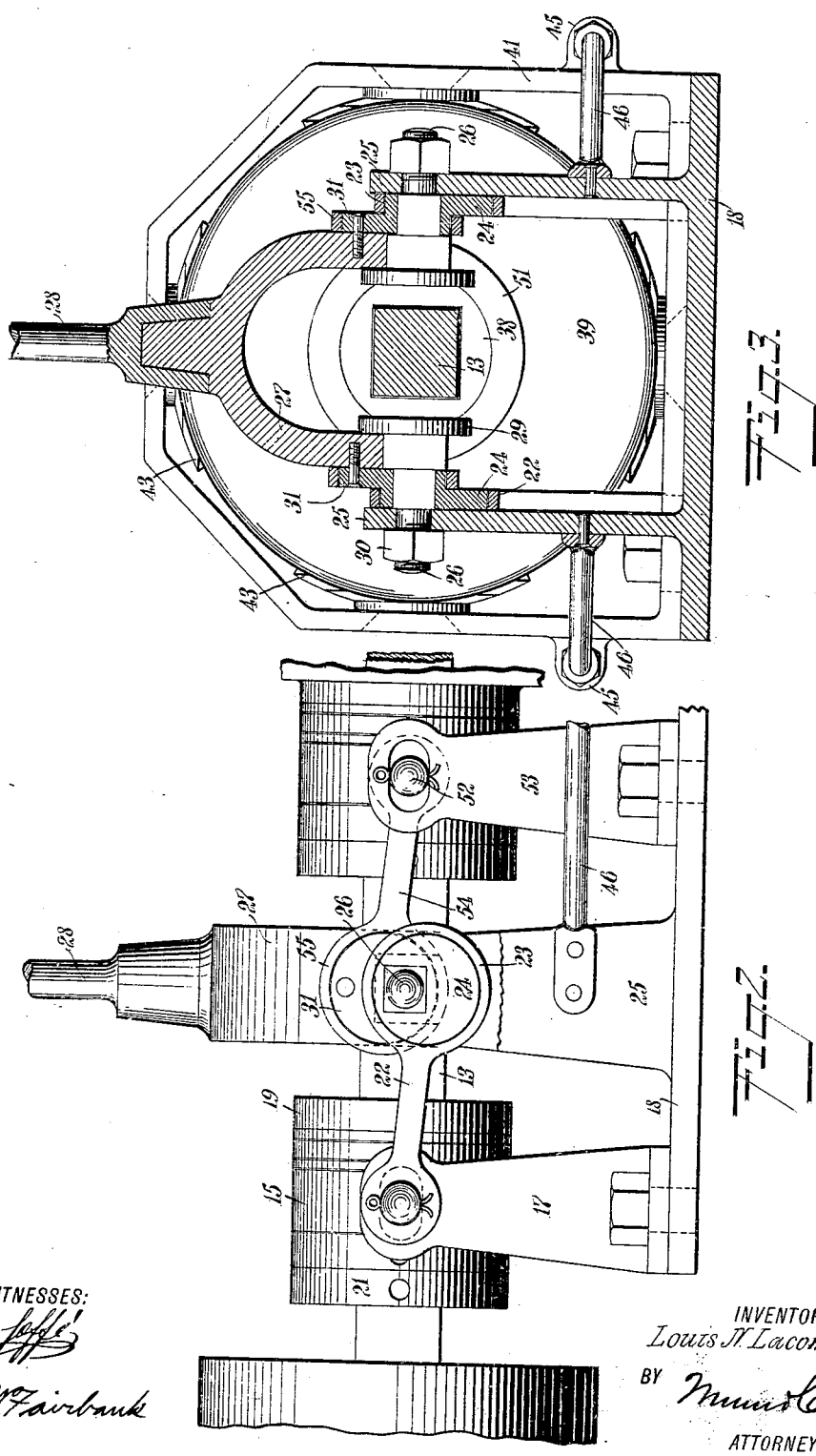

UNITED STATES PATENT OFFICE.

LOUIS N. LACOMBE, OF NEW YORK, N. Y.

FRICTION-GEARING.

979,315.  Specification of Letters Patent.  Patented Dec. 20, 1910.

Application filed January 27, 1910.  Serial No. 540,399.

*To all whom it may concern:*

Be it known that I, LOUIS N. LACOMBE, a citizen of the United States, and a resident of the city of New York, borough of Brooklyn, in the county of Kings and State of New York, have invented a new and Improved Friction-Gearing, of which the following is a full, clear, and exact description.

This invention relates to certain improvements in friction gearing for positively connecting driving and driven shafts, and more particularly to that type in which the driven shaft may be rotated in either direction in respect to the direction of rotation of the driving shaft.

In my improved gearing, I employ pinions rotatable about radial axes for rotating the driven shaft in the reverse direction to the driving shaft.

One of the main objects of my invention is to simplify the control of these pinions, so that they will be entirely out of operation and may remain stationary when the shaft sections are disconnected or when the direct drive is in use.

Other important objects of my invention and the important structural features thereof, will be set forth more in detail hereinafter and particularly pointed out in the claims.

Reference is to be had to the accompanying drawings, forming a part of this specification, in which similar characters of reference indicate corresponding parts in all the figures, and in which—

Figure 1 is a longitudinal section through a clutch constructed in accordance with my invention; Fig. 2 is a side elevation of one end portion thereof; and Fig. 3 is a transverse section on the line 3—3 of Fig. 1.

My improved gearing is adapted for use in connecting any driving element to a driven element, and for purposes of illustration I have here shown the two elements as shafts 10 and 11. Either the shaft 10 or the shaft 11 may constitute the driving shaft and the other constitute the driven shaft, but for sake of clearness, I will hereinafter refer to the shaft 10 as the driving shaft and the shaft 11 as the driven shaft. The two shafts 10 and 11 are spaced apart and in alinement with each other, and between the two ends are two shaft sections 12 and 13, non-circular in cross section. Both of these shaft sections are held against rotation in respect to the shaft 10, and the shaft section 13 is free to move longitudinally toward and from the shaft 11. For reciprocating this shaft section 13, I provide a collar 14, which is shrunk or otherwise rigidly secured thereto, and this collar is supported within a ring 15. The ring has outwardly-extending trunnions 16 mounted in uprights 17 on a main base 18, and these uprights have slots extending in the same general direction as the shaft, so as to permit the trunnions to slide along the slots. The collar 14 is free to rotate within the ring 15, while the trunnions prevent the rotation of the latter. The collar, at one end, has an outwardly-extending flange 19, and intermediate this flange and the ring is a suitable ball bearing 20, so that when the ring is forced axially to move the collar in one direction, the ball bearing will receive the thrust and reduce friction. At the opposite end of the collar, two nuts 21, 21 are employed for holding the ring adjacent the ball bearing and preventing any axial movement of the collar in respect to the ring. For moving the ring and collar axially, two links 22, 22 are mounted upon the outer ends of the trunnions and extend substantially parallel to the shaft. Each link terminates at its forward end in an eccentric strap 23 receiving an eccentric 24. Two uprights 25, 25 are carried by the base 18, and through these uprights extend pivot bolts 26. The eccentric 24 is mounted upon a non-circular portion of the pivot bolt 26, so that as the bolts 26 are rotated, the eccentrics will pull the links 22 lengthwise to reciprocate the shaft section 13. For rotating the pivot bolts, I provide an upwardly-extending yoke 27, having a handle 28 at its upper end and having the lower end of its arms secured upon non-circular portions of the bolts 26. The bolts preferably have their heads 29 upon the inner end, and each extends outwardly through the arm of the yoke, through the eccentric, and thence through the upright 25. The outer end of the bolt may carry a suitable nut 30.

In addition to the eccentrics 24, I provide eccentrics 31, which, if desired, may be cast integral with the eccentrics 24, but in any event are caused to move upon the oscillation of the pivot bolts 26. The eccentrics 24 and 31 have opposite eccentricity, as is illustrated particularly in Figs. 2 and 3. Each eccentric 31 may be rigidly secured to its corresponding arm of the yoke 27, by a suitable screw, in order to additionally hold the parts against relative movement. It is thus evident that as the handle 28 is moved toward the left-hand from the position indicated in Fig. 2, the eccentrics 24 will pull the links 22 lengthwise and reciprocate the ring 15, the collar 14 and the shaft 13, toward the right-hand end of the clutch. Upon swinging the handle 28 toward the right-hand, the shaft section 13 will be reciprocated toward the left hand.

For effecting the clutching action between the clutch section 13 and the driven shaft 11, I provide the driven shaft with a collar 32, keyed or otherwise rigidly secured thereon and having in its outer end and in alinement with the shaft 11, a conical recess 33. The shaft section 13 terminates in a conical head 34, which may fit into this recess, so that as the shaft section 13 is forced lengthwise toward the shaft 11, its head fits into the conical recess, and the shaft sections 11 and 13 are positively locked against relative rotation. For guiding the end of the shaft section 13, it may have a terminal spindle 35 beyond the head 34 and sliding within an axial opening in the collar 32.

The mechanism above described serves for the direct transmission of power from the driving to the driven shaft. For rotating the driven shaft in the reverse direction, I provide a reverse gearing which includes a plurality of radially-disposed pinions movable into and out of operative position. The collar 32, above referred to, serves not only for the reception of the conical end 34 of the shaft section 13, but it also constitutes a gear member for use in the reverse direction. The collar has an outwardly-extending annular flange 36 having its outer face beveled and provided with a plurality of concentric circumferential corrugations 37. Directly opposed to the collar 32 and in alinement therewith, is a collar 38, slidably mounted upon the shaft section 13. The collar 38 presents an annular flange 39 similar to the flange 36, and this flange 39 has a beveled face provided with a series of concentric corrugations 40. A frame 41 is mounted upon the base 18, and is free to slide longitudinally thereof through a limited distance. The frame carries a plurality of inwardly-extending pivot pins 42, which are connected together at their inner ends by an annular collar 41ª, concentric with the shaft section 13, and constituting a portion of the frame 41. Rotatably mounted upon the pivot pins 42, are a plurality of cones 43, each presenting a plurality of annular corrugations or flanges 44. The taper of each cone is such that its corrugations 44 may enter the grooves in both of the bevel gear members 36 and 39, so that all three gear members, that is, the parts 36, 39 and 43, will be caused to rotate simultaneously. In order to prevent binding of the corrugations of the pinions with the corrugations of the bevel friction members, the outer side of each corrugation is curved, while the inner side is substantially straight.

With the collar 38 in the position indicated in Fig. 1, it is out of engagement with the pinions 43, and, therefore does not transmit motion to the latter. Likewise, the pinions are out of engagement with the gear member 36. For moving the pinions to this position, I provide the frame 41 with outwardly-extending lugs 45 upon opposite sides thereof, and suitable tie-rods 46 extend through these lugs. The rods are not rigidly connected to the lugs but extend freely therethrough, and upon each rod are two springs 47 and 48, each pressing against the lug 45 and against an outer nut on the rod. The springs are both under tension and the rods are held against longitudinal movement in any suitable manner, as, for instance, by being rigidly secured to the uprights 25. The springs thus tend to move the frame 41 to such a position that the two springs 47 and 48 will both be under the same tension, but they permit the frame to be moved longitudinally in either direction, so as to compress one spring and release the other. The position which the frame normally tends to take, is one in which the pinions will be out of engagement with the gear member 36.

For moving the collar 38 into or out of operative position, I provide mechanism very similar to that employed for reciprocating the shaft section 13, and I also so mount this operating mechanism that the collar 38 and the shaft section 13 will be simultaneously reciprocated in opposite directions. As shown, the collar 38 extends through a ring 49, and the ring is held against a ball bearing 50 by two lock nuts 51. The ring has outwardly-extending trunnions 52, which are slidably mounted within uprights 53, and secured to each trunnion is a link 54 terminating in an eccentric strap 55. The eccentric straps 55 encircle the eccentrics 31 above referred to, and these eccentrics are rotated by the oscillation of the handle 28. By swinging the handle in one direction, the eccentrics force the links 54 lengthwise and the ring moves the collar 38 toward the right hand of the device from the position indicated in Fig. 1. The gear member first comes into engagement with the pinions 43 and further axial movement of the gear member moves the pinions and the frame 41 against the tension of the springs 48, until the pinions come into engagement with the gear member 36. The motion will now be transmitted from the shaft 13 to the gear member 39, thence to the pinions 43 and to the gear member 36, which will be caused to rotate in the reverse direction to the gear member 39. It will be noted that the movement of the gear member 39 into operative position simultaneously, moves the shaft section 13 in the reverse direction, so that the driven shaft cannot possibly be connected for rotating in one direction while it is still connected for rotation in the reverse direction. With the handle 28 extending vertically, both the cone clutch 34 and the gear member 39, will be out of position, so that the driven shaft 11 will remain stationary.

Various changes may be made in the construction of my improved clutch, without departing from the spirit of my invention.

Having thus described my invention, I claim as new and desire to secure by Letters Patent:

1. In combination two opposed gear members in axial alinement, a pinion intermediate said gear members, a frame supporting said pinion and normally tending to move said pinion out of engagement with one of said gear members, and means for moving the other gear member into engagement with the pinion.

2. In combination two opposed gear members, a pinion intermediate said gear members, a sliding frame carrying said pinion, a spring normally tending to move said frame to bring the pinion out of engagement with one of said gear members, and means for moving the other gear member into engagement with the pinion to bring the pinion into engagement with the first-mentioned gear member.

3. In combination two opposed gear members in axial alinement and each presenting a beveled face with concentric corrugations, a pinion intermediate said gear members and having a series of concentric corrugations adapted to intermesh with the corrugations of the gear members, a sliding frame carrying said pinion, and yielding means normally tending to move said frame in one direction to bring the pinion out of engagement with one of said gear members.

4. In combination a base, a driving shaft mounted thereon, a driven shaft mounted upon said base and in axial alinement with said driving shaft, gear members carried by said shafts, a frame intermediate said gear members and slidably mounted upon said base, a pinion carried by said frame and disposed between said gear members, rods secured to said base, and springs encircling said rods and having engagement with said frame, for normally tending to move the frame in one direction, to bring the pinion out of engagement with one of said gear members.

5. In combination a base, a driving shaft mounted thereon, a driven shaft mounted on said base and in axial alinement with said driving shaft, gear members carried by said shafts, a frame intermediate said gear members and slidably mounted upon said base, a pinion carried by said frame and disposed between said gear members, rods secured to said base, springs encircling said rods and having engagement with said frame, for normally tending to move the frame in one direction, to bring the pinion out of engagement with one of said gear members, and means for moving the other gear member toward said pinions.

6. In combination a driving shaft section movable axially, a clutch member mounted thereon and movable axially, and means for simultaneously moving said shaft section and said clutch member in reverse directions.

7. In combination a driving shaft section movable axially, a clutch member mounted thereon and movable axially, and means for simultaneously moving said shaft section and said clutch member in reverse directions, said shaft section serving for direct transmission when in one limiting position, and said clutch member serving for reverse drive when said shaft section is in its opposite limiting position.

8. In combination a reciprocating shaft section, a gear member mounted thereon, a collar secured to said shaft section, a collar secured to said gear member, and means in engagement with said collars for moving them simultaneously toward or away from each other.

9. In combination a reciprocating shaft section, a gear member mounted thereon, a collar secured to said shaft section, a collar secured to said gear member, non-rotatable rings encircling said collars, links connected to said rings, and means for simultaneously moving said links in opposite directions.

10. In combination a drive shaft section movable longitudinally for direct driving action, a clutch member mounted thereon and adapted for reverse drive connection, a collar secured to said shaft section, a collar secured to said gear member, uprights intermediate said collars, pivot bolts mounted to rotate within said uprights, eccentrics carried by said bolts, and means for connecting said eccentrics and said collars, whereby the oscillation of said pivot bolts tends to move said collars simultaneously in opposite directions.

11. In combination, two opposed gear members movable relatively toward and from each other, a pinion intermediate said gear members and rotatable about an axis at right angles to the axes of said gear members and serving to transmit motion from one gear member to the other when the latter are in predetermined relative positions, a shaft non-rotatable in respect to one of said gear members but movable axially relatively thereto, and means for directly connecting said shaft and the other gear member when said gear members are spaced to prevent the transmission of power through said pinion.

12. In combination, two opposed gear members movable relatively toward and from each other, a pinion intermediate said gear members and rotatable about an axis at right angles to the axes of said gear members and serving to transmit motion from one gear member to the other when the latter are in predetermined relative position, a shaft non-rotatable in respect to one of said gear members but movable axially relatively thereto, means for directly connecting said shaft and the other gear member, and means for reciprocating said shaft and its gear member simultaneously in opposite directions, to control the relative direction of rotation in respect to the other gear member.

In testimony whereof I have signed my name to this specification in the presence of two subscribing witnesses.

LOUIS N. LACOMBE.

Witnesses:
CLAIR W. FAIRBANK,
PHILIP D. ROLLHAUS.